UNITED STATES PATENT OFFICE.

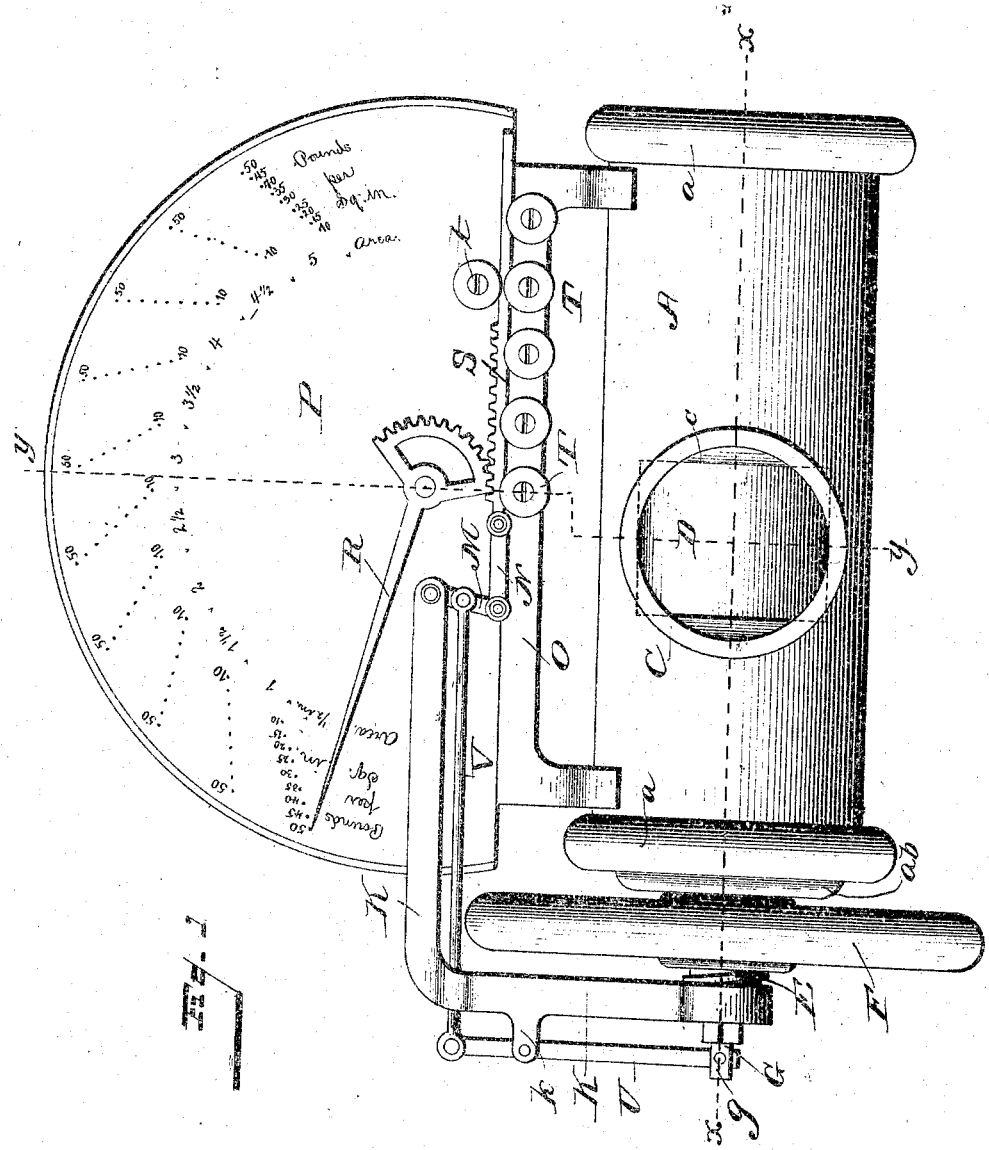

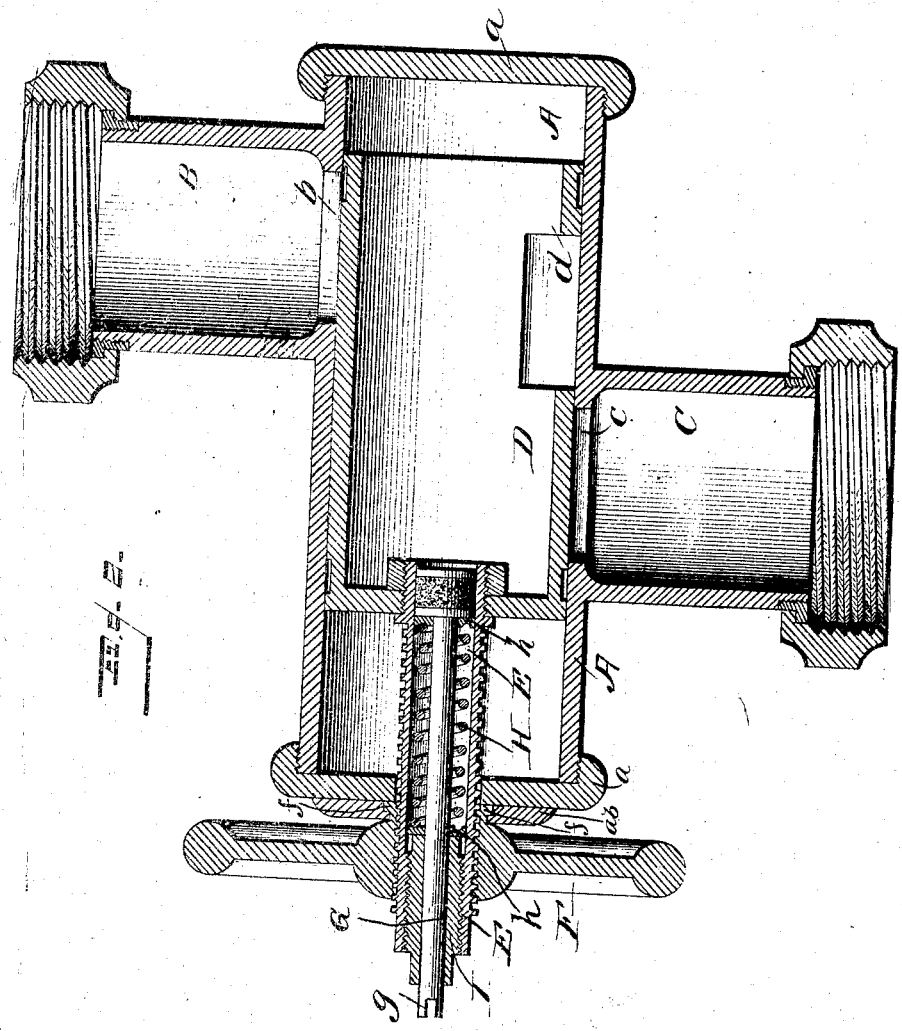

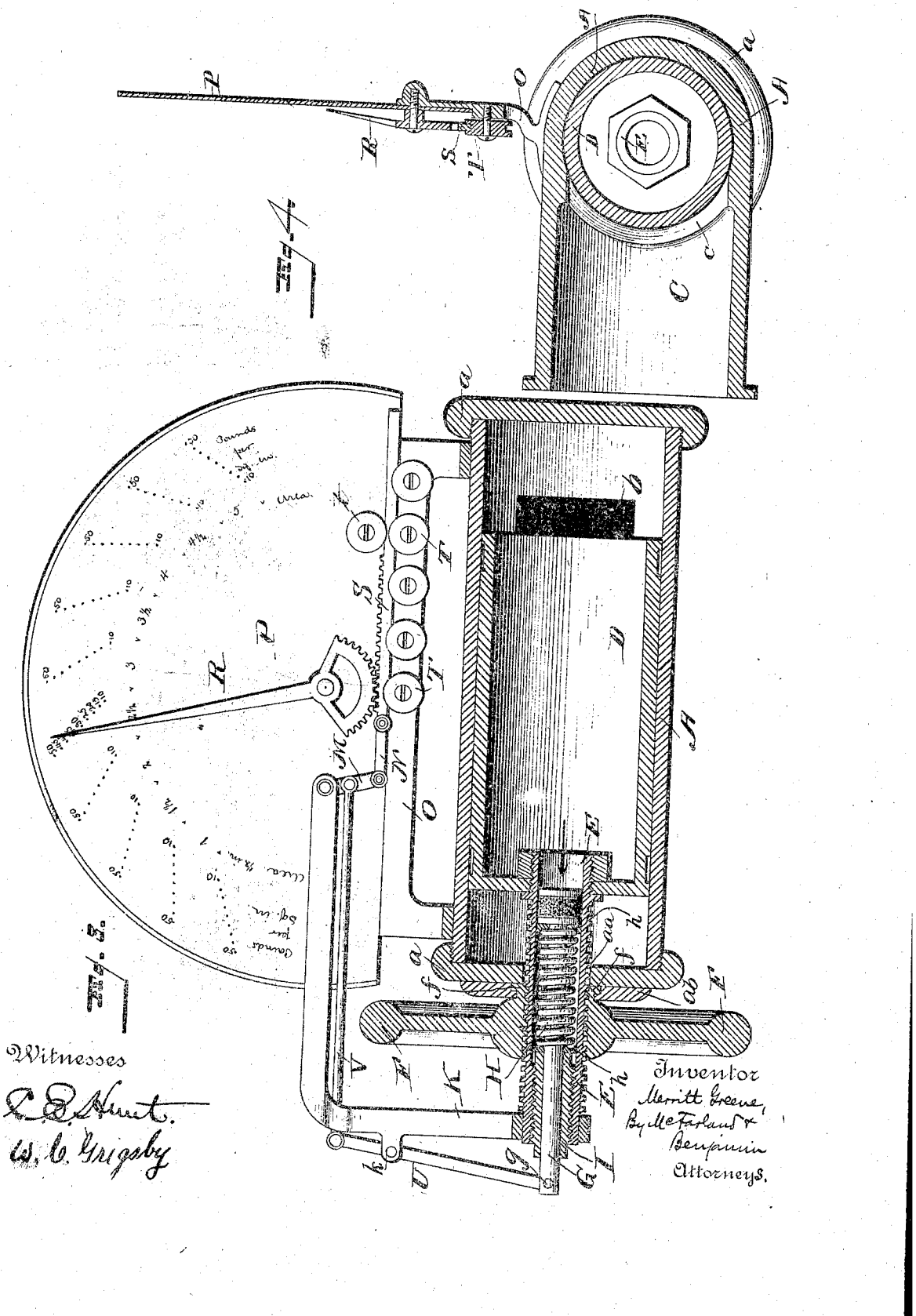

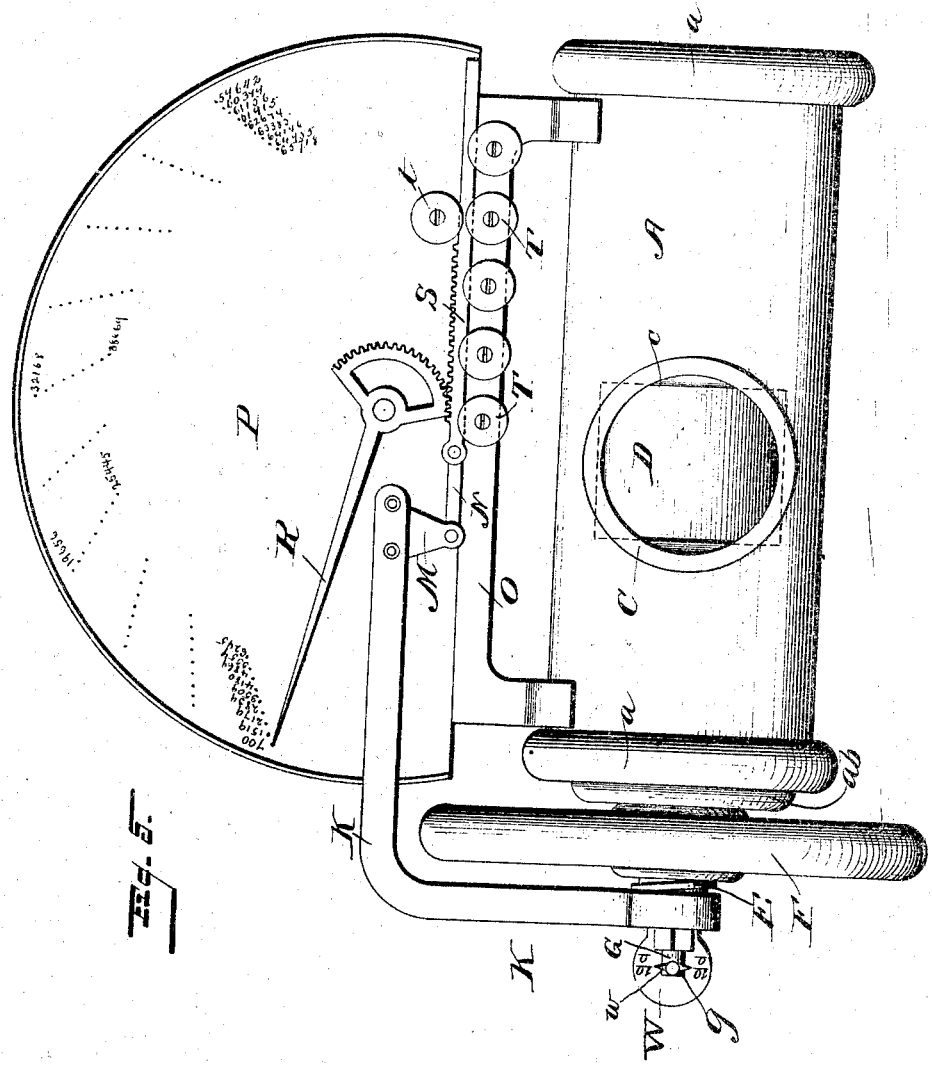

MERRITT GREENE, OF PITTSBURG, PENNSYLVANIA.

PRESSURE-INDICATOR.

SPECIFICATION forming part of Letters Patent No. 505,652, dated September 26, 1893.

Application filed March 10, 1893. Serial No. 465,651. (No model.)

*To all whom it may concern:*

Be it known that I, MERRITT GREENE, a citizen of the United States, residing at Pittsburg, in the county of Allegheny and State of Pennsylvania, have invented certain new and useful Improvements in Pressure-Indicators for Air or Gas; and I do hereby declare the following to be a full, clear, and exact description of the invention, such as will enable others skilled in the art to which it appertains to make and use the same.

This invention relates to improvements in pressure indicators for gas or air at high pressures, and its object is to furnish a measuring and registering instrument that shall be portable, so that it may be carried about to natural gas wells or shifted about in factories; easy of application, so that it may commend itself as a practicable machine, and accurate, so that its measurements may be accepted without controversy.

In the machine embodying the invention, a positively known area for the passage of gas or air is associated with a positively determined pressure of gas or air passing through that opening, so that by means of an adjustable gage for determining pressure and an adjustable valve for regulating area, it is possible to know accurately both the volume and amount of gas or air passing through the meter.

In the accompanying drawings, wherein like letters represent like parts, Figure 1 is a side elevation of the meter at rest; Fig. 2, a horizontal, lengthwise sectional view on the line $x-x$ of the first figure; Fig. 3, a vertical, lengthwise sectional view, taken centrally and showing the meter in operation; Fig. 4, a vertical, crosswise section on the line $y-y$ of the first figure taken from the rear; and Fig. 5, a side elevation, like the first figure, showing a modification to be described.

A is a hollow cylinder, closed at both ends; the closure being effected by screw caps, $a$, preferably. Offset from the cylinder, near what shall be regarded as its rear end, is a tube, B, communicating with the cylinder through a rectangular orifice, $b$, and with its open outer end screw threaded or otherwise suitably adapted to make a gas-tight connection with a pipe-coupling fitted thereto. Similarly offset from the cylinder, near its center and in the opposite direction from the other offset, is a like tube C, communicating with the cylinder through a rectangular orifice, $c$, of the same size as the orifice already mentioned, and with its open outer end screw threaded or otherwise suitably adapted to make a gas-tight connection with a pipe-coupling.

Fitting closely but movably within the cylinder is a hollow piston, D, entirely open at its rear end, and having a rectangular slot, $d$, a little forward of said rear end, corresponding in size and lines of direction to the orifice $c$ in one of the offset tubes of the cylinder. Inserted through and projected from the front and otherwise closed end of the piston is a tubular shaft, E, screw-threaded on its outside and passing freely through the front end of the cylinder A, which is provided with an orifice, $a\,a$, for the projection of the shaft. A hand wheel, F, is mounted upon the shaft, the interior of its hub being screw threaded to engage the threaded surface of the shaft. The hub of the wheel is formed on its inner vertical face into a rim, $f$, which fits against the front end of the cylinder, and this rim is embraced by a collar, $a\,b$, fast upon the end of the cylinder.

Within and projecting from the tubular shaft is a rod, G, having the head at its inner end suitably packed fitting the bore of the shaft. Around the stem of this rod is a loose spiral spring, H, the ends of which are seated in recessed washers, $h$, whereof the inner washer bears against the head of the rod and the outer against a screw plug, I, threaded into the mouth of the tubular shaft, and bored through longitudinally for the passage of the stem of the rod within the shaft.

Upon the tubular shaft, outside of the hand wheel, is fastened one end of a yoke, K, whereof the vertical part is projected into a bracket, $k$, while the horizontal part is pivoted to a vertical link, M, which is pivoted to a horizontal link, N, to which further reference will be made.

On top of the cylinder is fastened a frame, O, supporting a dial, P, upon which is pivoted an indicator, R, the base of which is formed into a segmental rack, meshed with a straight rack, S, traveling upon a set of grooved wheels, T, supported in the frame. Another wheel, $i$, mounted on the dial, bears down upon the outer end of the straight rack.

Pivoted to the bracket of the yoke, so as to swing thereon, is a lever, U, the lower end of which is pivoted to the end of the rod projecting from the before mentioned tubular shaft. The upper end is pivoted to a horizontal bar, V, which is pivoted near the center of the aforesaid vertical link M, which, as already stated, is pivoted to the horizontal link N, and this last named link is pivoted to the proximate end of the straight rack supported upon the frame on top of the cylinder.

In the operation of the machine the gas or air to be registered as to its pressure enters the offset tube B through a pipe coupling. By rotation of the hand wheel F, the piston D is drawn forward within the cylinder A till it begins to uncover the rectangular orifice $b$, when the supply will begin to enter the cylinder, and pass into the piston through its open end. Simultaneously with the uncovering of the orifice $b$ will begin the uncovering of the rectangular orifice $c$, in the offset tube C, by means of the rectangular slot $d$ in the piston, and the area of opening in the two orifices, $b$ and $c$, will be always the same. This area of opening is indicating in square inches upon the dial, as exemplified by the curved bottom row of figures upon the dial shown in the first and third figures of the drawings, which figures upon the dial are given in a progression of half inches, though any desired units of progression, and any desired standards of area, may be used in a machine of this construction. Each of these units, progressing by half inches upon the dial as herein represented, is a zero point in the series of scales used for the different port areas of the device; that is, the different positions of the piston D in the large cylinder of the machine. The indicator being at zero, on the left of the dial, when the hollow piston is so adjusted within the cylinder as that its next movement will begin the admission of gas or air, each revolution of the hand wheel, in moving the piston, will move the aforesaid yoke outward, causing it to pull forward the straight rack upon the dial, and moving the indicator toward the right, and so measuring along the lower line of figures the area of opening through which gas is flowing. Following the adjustment and measurement of area, the pressure of the gas or air admitted to the hollow piston will be received within the tubular shaft, upon the head of the rod therein, and so against the spiral spring around the rod. That spring having, by means of the screw plug forming an adjustable bearing for it at one of its ends, been regulated to transmit the pressure in units of pounds, or otherwise, and the adjustment being harmonized, in a manner familiar to gas engineers and other machinists, with the mechanical adjustment for area, it follows that when the area of opening for gas or air flow is transmitted to the indicator, the upright lever attached to the projecting rod within the tubular shaft of the piston transmits to the indicator at the same time the amount of pressure exerted through the amount of area registered by the indicator.

In the drawings herewith, the series of numbers in diagonal columns for denoting the amount of pressure per square inch of area is calculated in pounds, and the values of the series of numbers on any dial will vary according to the size of the machine, and the greatness or smallness of the area through which pressure is to be exerted, whether the unit for pressure be a pound or otherwise.

In the modification shown by the fifth figure of the drawings, a small dial, W, is attached to the aforesaid yoke of the machine and moves in and out with the movement of its support. A pointer, $w$, is fixed to the projecting end of the rod G and stands at zero upon the dial when the gas is shut out of the cylinder, but moves to the figure "10" upon the little dial when the spring is suitably adjusted by the screw plug and the pressure reaches just ten pounds per square inch of gas flow. The little dial may be gaged to other than ten pound pressures, if desired. The large dial P is spaced as shown in the third figure of the drawings and the spaces are marked with the number of cubic feet of gas that will pass, at ten pounds or some other predetermined pressure, through areas corresponding to the scales of figures.

Having thus described my invention, I claim the following:

1. A new apparatus for indicating the pressure of gas or air at high pressure, combining for its necessary and coacting parts the hollow, closed cylinder, having the orifice and the collar at its front end; the offset tube near the rear end of the cylinder, having the rectangular orifice at its inner end; the offset tube near the center of the cylinder, in opposite direction to the aforesaid offset tube and having the rectangular orifice at its inner end; the hollow piston fitting closely yet moving within the cylinder and having the rectangular orifice near its rear end; the tubular shaft, communicating with the hollow piston and projected from the front end thereof; the hand wheel screw threaded upon the tubular shaft, having the rim on its inner face, embraced by the collar of the aforesaid cylinder; the rod moving within and projecting from the tubular shaft, having the head fitting the tubular shaft, at its inner end; the spiral spring coiled loosely around the rod and bearing against the head thereof; the hollow screw plug, fitted adjustably within the mouth of the aforesaid tubular shaft and bearing against the outer end of the spiral spring; the yoke fitted upon the outer end of the tubular shaft and having the bracket projected from its vertical and exterior surface; the vertical link pivoted to the horizontal end of the yoke; the horizontal link pivoted to one end of the vertical link; the frame mounted upon the aforesaid hollow cylinder; the dial supported upon said frame; the movable indicator upon said dial; the straight rack meshed with the segmental, toothed base of the indicator and movably supported upon suitable wheels or rollers; the swinging lever depending from the bracket of the yoke aforementioned, and further pivoted to the outer end of the rod projected from the tubular shaft of the aforesaid piston; and the horizontal bar pivoted at one end to the swinging lever and at the other end to the vertical link connected to the aforesaid yoke; all constructed and arranged substantially as and for the purposes in this specification described.

2. The combination in an air or gas pressure indicator of the hollow closed cylinder, having the orifice and the collar at its front end; the offset tube near the rear end of the cylinder, having the rectangular orifice at its inner end; the offset tube near the center of the cylinder, in opposite direction to the aforesaid offset tube and having the rectangular orifice at its inner end; the hollow piston, fitting closely yet moving within the cylinder and having the rectangular orifice near its rear end; the shaft projected from the front end thereof; the hand wheel screw threaded upon the shaft, having the rim on its inner face, embraced by the collar of the aforesaid cylinder; the yoke fitted upon the outer end of the shaft; the vertical link pivoted to the horizontal end of the yoke; the horizontal link pivoted to one end of the vertical link; the frame mounted upon the aforesaid hollow cylinder; the dial supported upon said frame; the movable indicator upon said dial and the straight rack meshed with the segmental toothed base of the indicator and movably supported upon suitable wheels or rollers; the whole constructed and arranged substantially as herein described, for the purpose of registering the amount of gas or air passed into and out of the meter through a predetermined area for admission and discharge of the flow.

3. The combination in a pressure indicator for air or gas wherein the flow is received and discharged by a hollow piston working closely within the indicator case, of the dial, properly spaced and inscribed with numbers denoting pressure in units of weight; the indicator, pivoted to and moving over the face of the dial; the straight, movable rack, suitably supported upon wheels or rollers and meshed with the toothed, segmental foot of the indicator; the horizontal bar pivotally connected to the proximate end of the straight rack; the upright lever, pivoted by its upper end to the horizontal bar and swung at or near its own center from a suitable support; the headed rod pivoted at its outer end to the lower end of the swinging lever and communicating at its inner end with the hollow piston within the indicator case; and the spiral spring, seated within the tubular shaft proceeding from the hollow piston, also encircling the rod within said shaft and bearing by one end against the head of said rod and by the other end against the adjustable tubular plug screwed into the mouth of the aforesaid tubular shaft; the whole constructed and arranged substantially as herein described, for the purpose of registering the amount of gas or air passed through the indicator at a known pressure within the hollow piston.

4. The combination in a pressure indicator for air or gas of the hollow closed cylinder, having the orifice and the collar at its forward end; the offset tube near the rear end of the cylinder, having the rectangular orifice at its inner end; the offset tube near the center of the cylinder, in opposite direction to the aforementioned offset tube and having the rectangular orifice at its inner end; the hollow piston closely fitting and moving within the cylinder and having the rectangular orifice near its rear end; the shaft projected from the front end of the hollow piston through the orifice of the cylinder, and the hand wheel, screw threaded upon said shaft and having the rim on its inner face, embraced by the collar of the aforesaid cylinder; all substantially in the manner described, for the purpose of fixing the area of passage for the inflow and outflow of gas or air to be passed through the indicator.

Signed in the presence of two subscribing witnesses this 14th day of January, A. D. 1893.

MERRITT GREENE.

Witnesses:
 GEO. D. TINDLE,
 JNO. W. CULMED.